(12) United States Patent
Kim

(10) Patent No.: US 7,497,513 B2
(45) Date of Patent: Mar. 3, 2009

(54) BUFFER CUSHION FOR AUTOMOBILES

(76) Inventor: Tae-Sook Kim, 201-801, Lucky Apt., 911, Mandeok 3-Dong, Buk-Gu, Busan 616-788 (KR)

( * ) Notice: Subject to any disclaimer, the term of this patent is extended or adjusted under 35 U.S.C. 154(b) by 434 days.

(21) Appl. No.: 10/596,935

(22) PCT Filed: Sep. 15, 2004

(86) PCT No.: PCT/KR2004/002389

§ 371 (c)(1),
(2), (4) Date: Jun. 29, 2006

(87) PCT Pub. No.: WO2005/070720

PCT Pub. Date: Aug. 4, 2005

(65) Prior Publication Data

US 2007/0138844 A1    Jun. 21, 2007

(30) Foreign Application Priority Data

Jan. 26, 2004   (KR) .................. 10-2004-0004720

(51) Int. Cl.
    *A47C 31/00* (2006.01)
(52) U.S. Cl. ....................... 297/180.11; 297/180.14; 297/452.42; 5/654
(58) Field of Classification Search ................ 5/654; 297/180.14, 180.11, 452.42
    See application file for complete search history.

(56) References Cited

U.S. PATENT DOCUMENTS 5,369,829 A * 12/1994 Jay ............................. 5/654
6,588,038 B1 * 7/2003 Bondie et al. ................ 5/709

FOREIGN PATENT DOCUMENTS

| JP | 63-159553 | 10/1988 |
|----|-----------|---------|
| JP | 10-014718 | 1/1998 |
| KR | 20-2003-0031656 | 12/2003 |

* cited by examiner

*Primary Examiner*—Fredrick Conley
(74) *Attorney, Agent, or Firm*—IPLA P.A.; James E. Bame

(57) ABSTRACT

The present invention discloses a buffer cushion for automobiles including: a main air chamber (2) having a size corresponding to the sizes of the automobile seats; an auxiliary air chamber (3) having a relatively smaller size than the main air chamber (2); an interconnecting chamber (4) formed integrally with the main air chamber (2) and auxiliary air chamber (3) for communicating the main air chamber (2) and the auxiliary air chamber 3 with each other to allow air injected into the buffer cushion to freely move between the main air chamber (2) and the auxiliary air chamber (3); and adjusting means (5) that is mounted on the auxiliary air chamber (3) for buffering the impact applied to the main air chamber (2) and adjusting a buffering force when the impact is applied to an automobile seat in upward and downward directions.

1 Claim, 5 Drawing Sheets

BUFFER CUSHION FOR AUTOMOBILES

TECHNICAL FIELD

The present invention relates to a buffer cushion for automobiles, and more particularly, to a buffer cushion for automobiles that is mounted on automobile seats in order to buffer the impacts applied to the automobile seats in upward and downward directions when a user gets on an automobile, such that even though he or she is on the automobiles for long hours, his or her fatigue can be significantly reduced.

BACKGROUND ART

Generally, impacts that are applied to automobile seats in upward and downward directions when people get on an automobile are buffered via the springs and shock absorbers connected with the automobile itself. However, they only serve to prevent the automobile itself during the collision with the irregular surfaces, i.e., bumps and depressions on the road or during cornering from being inclined in upward/downward and right/left directions by the action of centrifugal force at that time. Thus, the impacts that are applied directly to a driver's seat and other seats are typically buffered only by means of the cushion forces exerted by the automobile seat itself. In this case, the impacts applied to the automobile seats in the upward and downward directions are directly transmitted to people who sit on seats in the automobile, and therefore, if they are on the automobile for long hours, they get seriously tired. There is therefore a need for a new device for buffering the impacts applied to the automobile seat itself in order to drastically reduce a degree of fatigue the people on the automobile generally feel.

DISCLOSURE OF INVENTION

Accordingly, the present inventor has been made to solve the above-described problems, and it is an object of the present invention to provide a buffer-cushion for automobiles that is mounted on the automobile seats and is adapted to move air between a main air chamber and an auxiliary air chamber in order to buffer the impacts applied to the automobile seats in upward and downward directions when a user gets on the automobiles, such that even though he or she is on the automobiles for long hours, his or her fatigue can be remarkably reduced.

To accomplish the above object, according to the present invention, there is provided a buffer cushion for automobiles, comprising: a main air chamber having a size corresponding to the sizes of the automobile seats; an auxiliary air chamber having a relatively smaller size than the main air chamber; an interconnecting chamber formed integrally with the main air chamber and auxiliary air chamber for communicating the main air chamber and the auxiliary air chamber with each other to allow air injected into the buffer cushion to freely move between the main air chamber and the auxiliary air chamber; and adjusting means that is mounted on the auxiliary air chamber for buffering the impact applied to the main air chamber and adjusting a buffering force when the impact is applied to an automobile seat in upward and downward directions, wherein the adjusting means includes: a casing for accommodating the auxiliary air chamber therein, the casing having an adjustable slit formed thereon; a pressuring plate disposed at the inside of the casing and axially mounted at one side thereof to the casing by means of a hinge pin; and a plate spring mounted on the pressuring plate for pressurizing the pressuring plate at a predetermined spring elastic coefficient, the plate spring having an adjusting bolt fixed to one side thereof through the adjustable slit to be moved forward and backward along the adjustable slit.

BRIEF DESCRIPTION OF THE DRAWINGS

Further objects and advantages of the invention can be more fully understood from the following detailed description taken in conjunction with the accompanying drawings, in which.

BEST MODE FOR CARRYING OUT THE INVENTION

Now, an explanation on the preferred embodiment of the present invention will be in detail given with reference to attached drawings.

Figure 1:
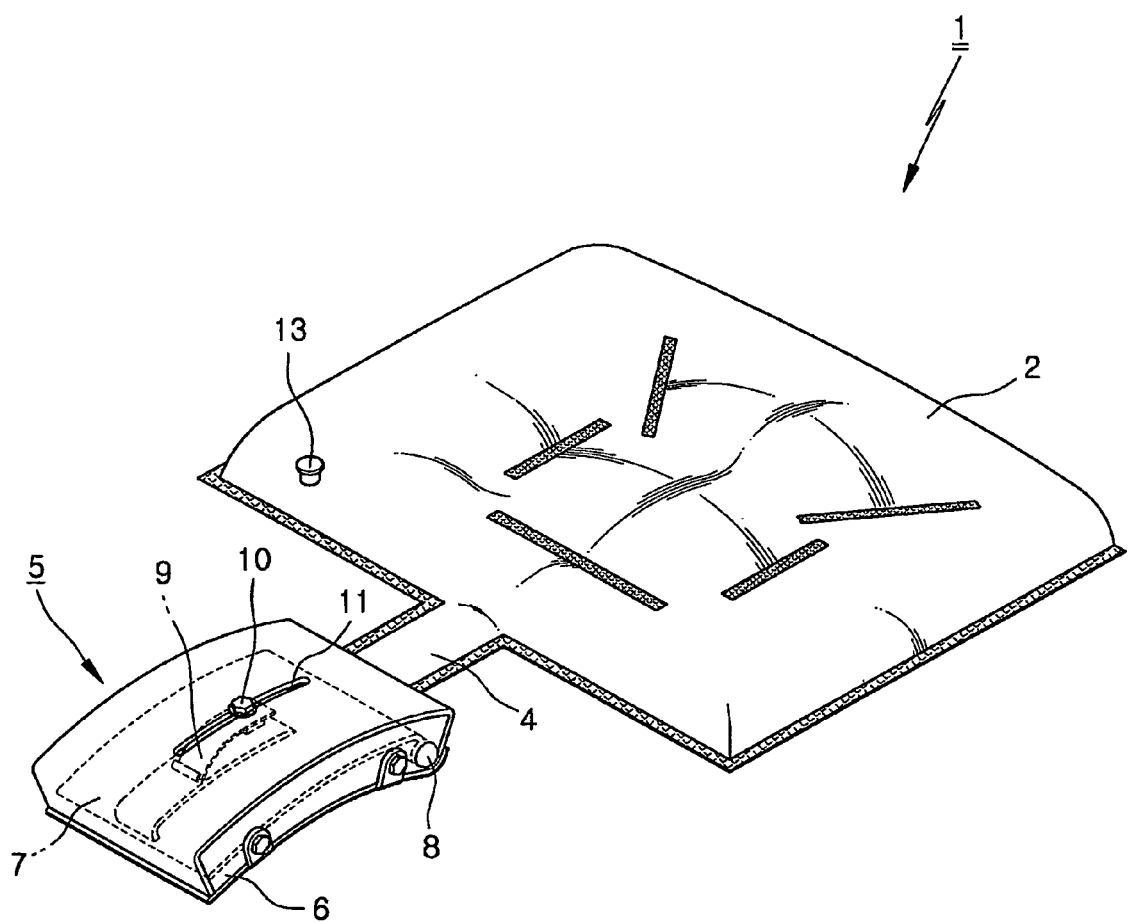
FIG. 1 is a perspective view showing a buffer cushion for automobiles according to a preferred embodiment of the present invention.
Figure 2:
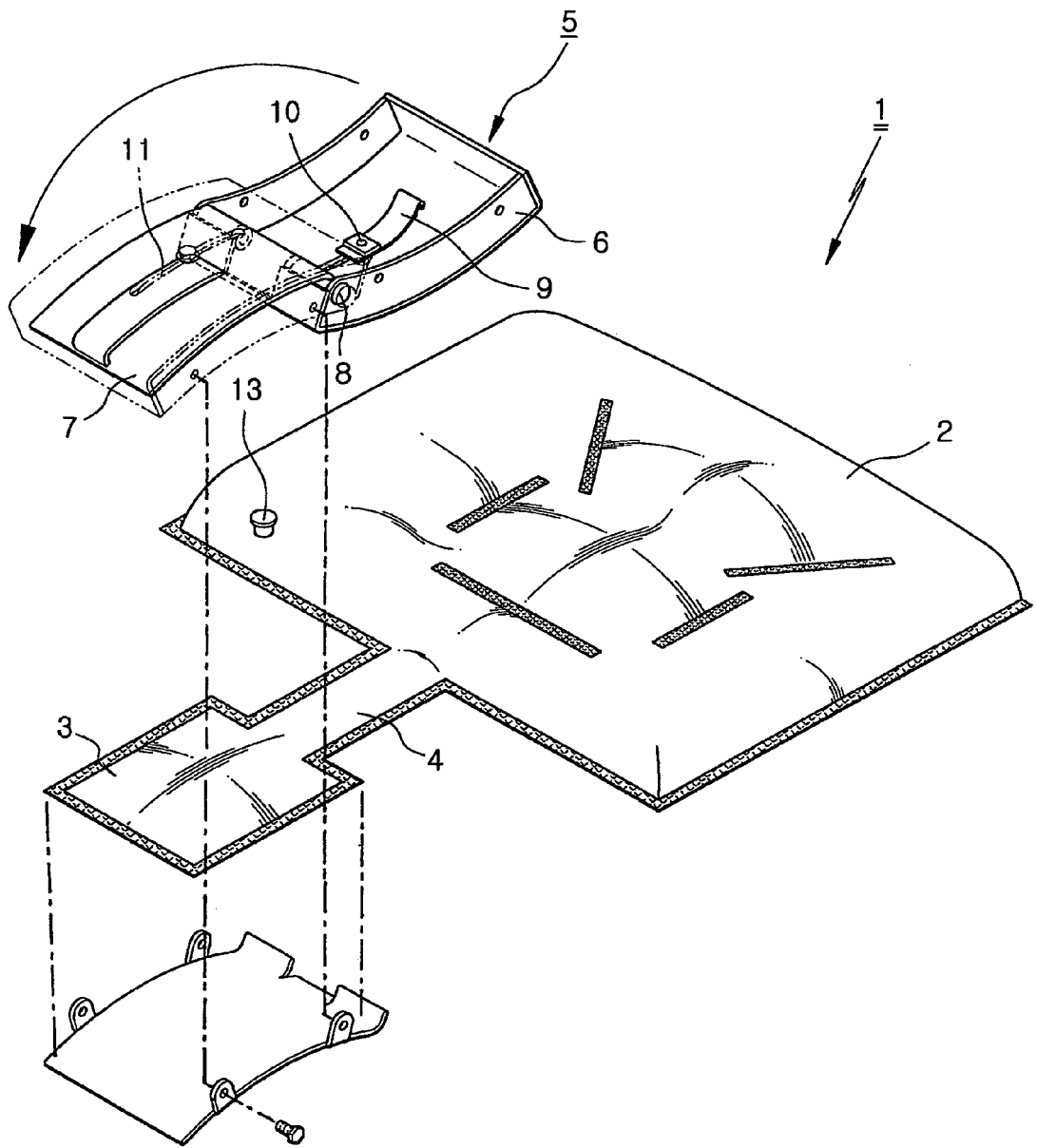
FIG. 2 is an exploded perspective view showing the buffer cushion for automobiles according to the preferred embodiment of the present invention.
Figure 3:
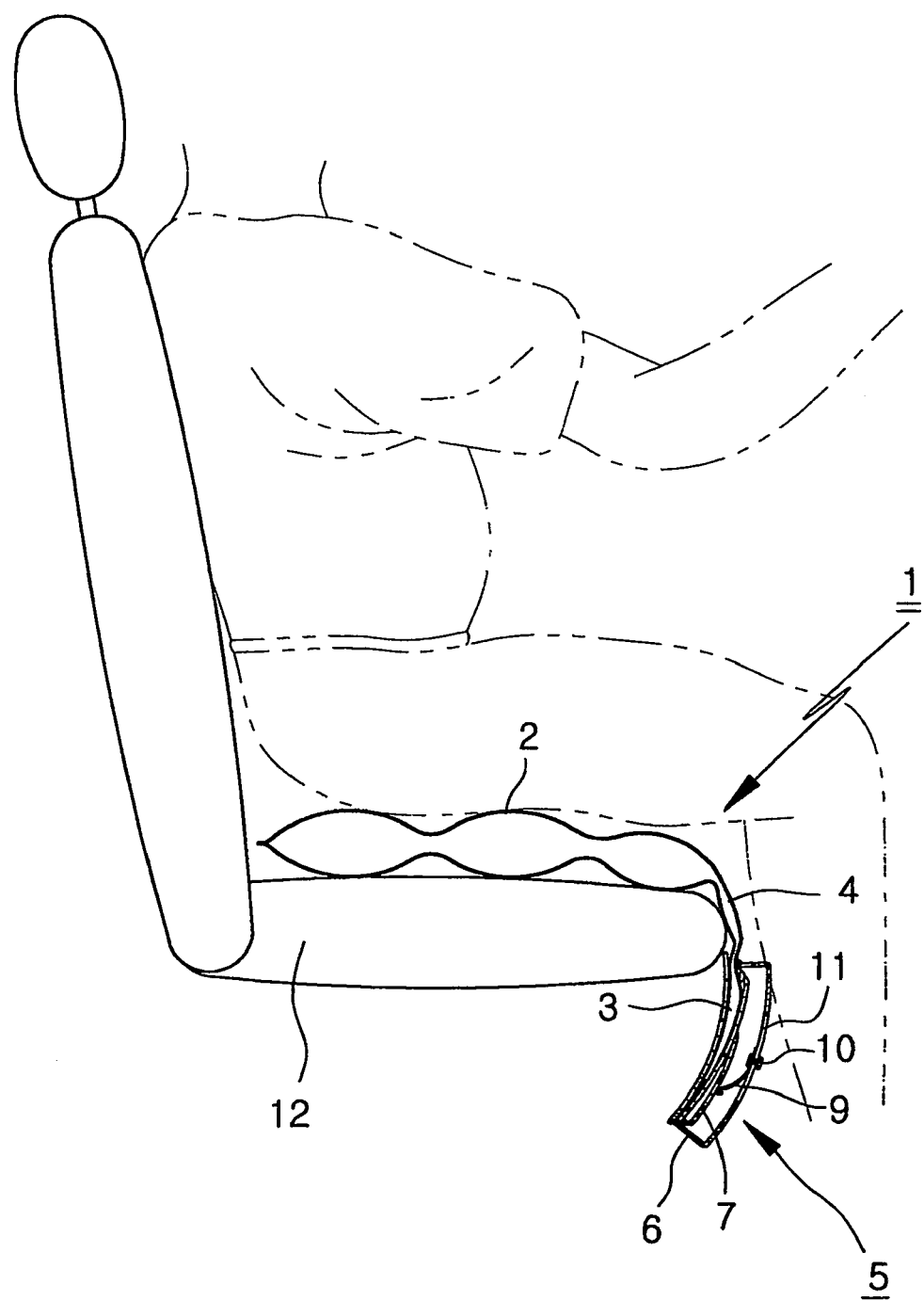
FIGS. 3 and 4 are sectional views showing the use example of the buffer cushion for automobiles according to the present invention.
Figure 4:
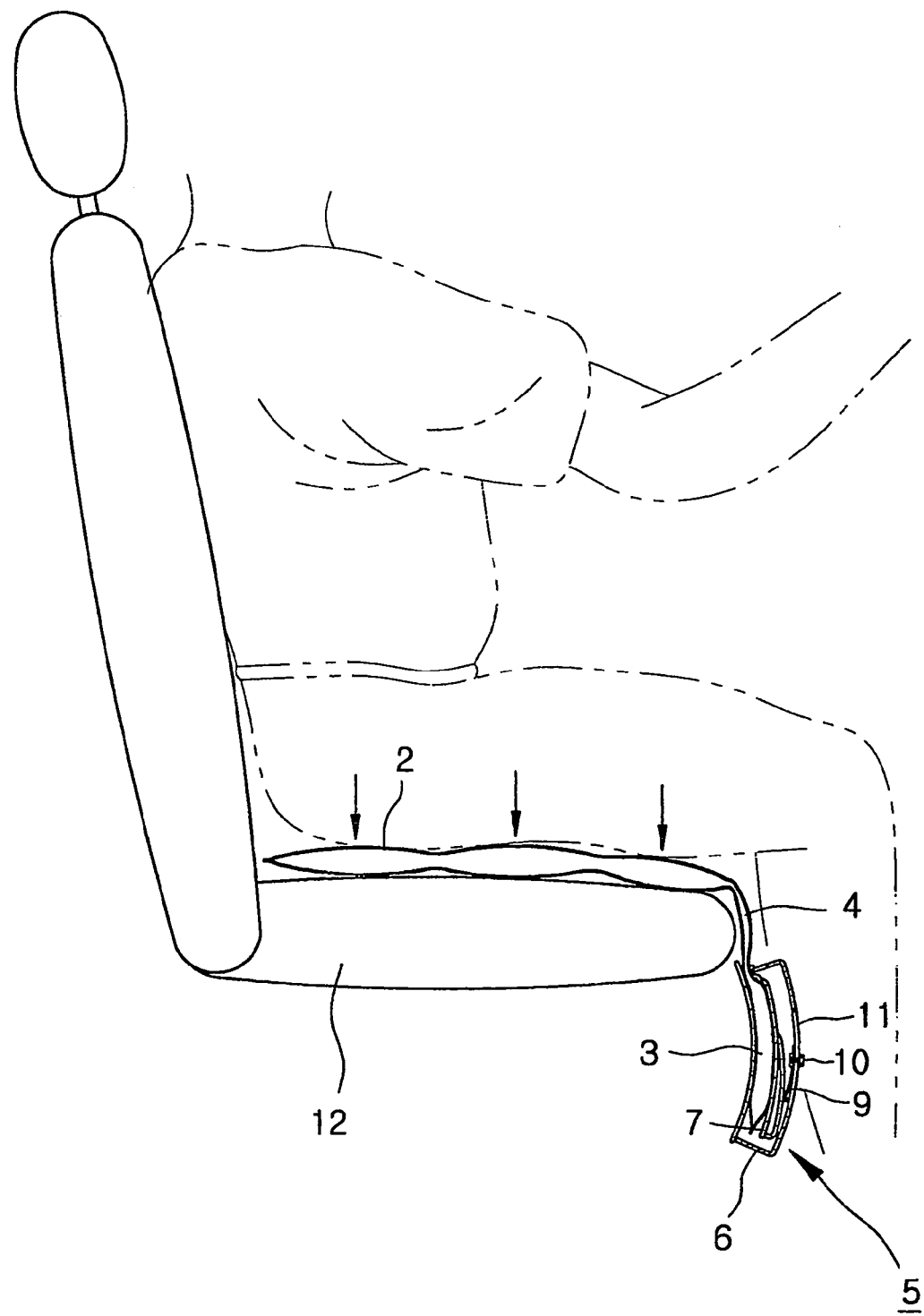
Figure 5:
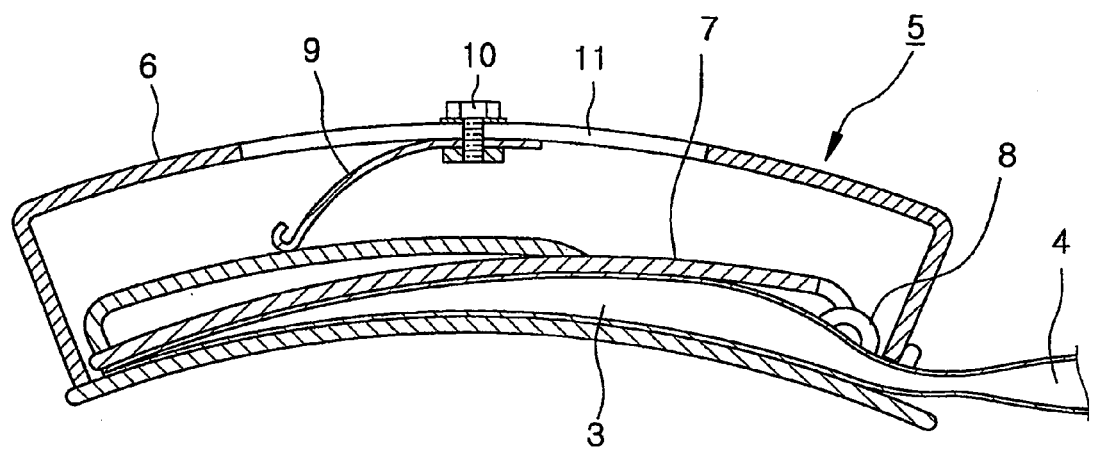
FIGS. 5 and 6 are exploded sectional views of the principal parts of the buffer cushion for automobiles in an operating state thereof.
Figure 6:
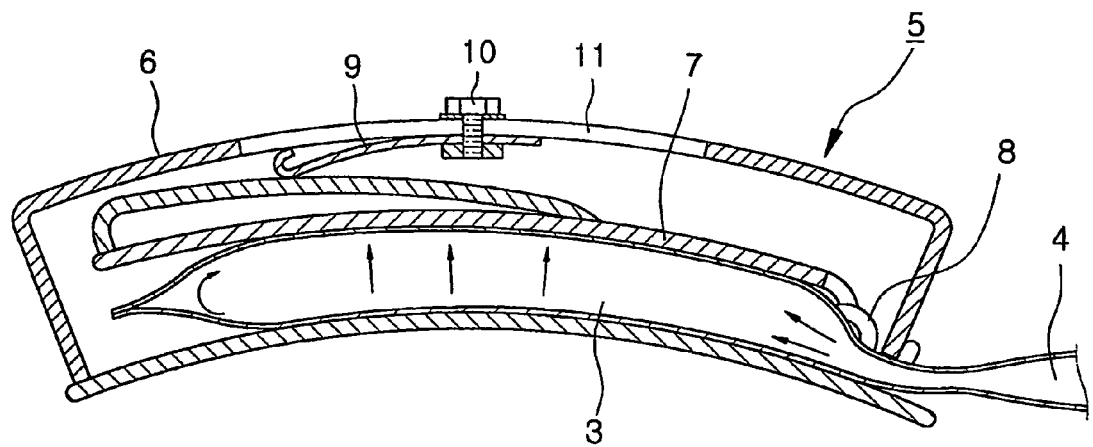

FIG. 1 is a perspective view showing a buffer cushion for automobiles according to a preferred embodiment of the present invention, FIG. 2 is an exploded perspective view showing the buffer cushion for automobiles according to the preferred embodiment of the present invention, FIGS. 3 and 4 are sectional views showing the use example of the buffer cushion for automobiles of the present invention, and FIGS. 5 and 6 are exploded sectional views of the principal parts of the buffer cushion for automobiles in an operating state thereof.

Referring to the drawings, there is shown a buffer cushion 1 for automobiles according to a first embodiment of the present invention. The buffer cushion 1 includes a main air chamber 2 that is formed in a size corresponding to the sizes of the automobile seats, an auxiliary air chamber 3 that is formed in a relatively smaller size than the main air chamber 2, and an interconnecting chamber 4 that is formed integrally with the main air chamber 2 and the auxiliary air chamber 3 for communicating the main air chamber 2 and the auxiliary air chamber 3 with each other to allow air injected into the buffer cushion 1 to freely move between the main air chamber 2 and the auxiliary air chamber 3. Furthermore, the buffer cushion 1 includes adjusting means 5 that is mounted on the auxiliary air chamber 3 for buffering the impact applied to the main air chamber 2 and simultaneously for adjusting a buffering force when the impact is applied to an automobile seat in upward and downward directions.

The adjusting means 5 includes a casing 6 for accommodating the auxiliary air chamber 3 therein, the casing having an adjustable slit 11 formed thereon, a pressuring plate 7 disposed at the inside of the casing and axially mounted at one side thereof to the casing by means of a hinge pin 8, and a plate spring 9 that is mounted on the pressuring plate 7 and is adapted to pressurize the pressuring plate 7 at a predetermined spring elastic coefficient. The plate spring has an adjusting bolt 10 fixed to one side thereof through the adjustable slit 11 to be moved forward and backward along the adjustable slit.

The above embodiment of present invention has described that the air is injected into the main air chamber 2, the interconnecting chamber 4 and the auxiliary air chamber 3, but fluid like water may be injected thereto, which carries out the same action and function as those with the air.

Herein, a reference numeral 12 denotes an automobile seat and a reference numeral 13 depicts an air injection hole.

With the above construction, the buffer cushion 1 for automobile seats according to the present invention is mounted on the automobile seat 12. To this end, first, an appropriate amount of air is injected into the main air chamber 2 and the auxiliary air chamber 4 through the air injection hole 13. After that, the buffer cushion 1 is mounted on the automobile seat 12, and if a user sits on the buffer cushion 1, the impacts that are applied to the automobile seat 12 itself are greatly absorbed by the buffering force of the automobile seat 12 itself and by virtue of the air injected into the main air chamber 2 and the auxiliary air chamber 3.

As shown in FIGS. 3 and 4, when the user who sits on the buffer cushion 1 drives the automobile while passing by bumps and depressions on the road, the impacts that are applied to the automobile body in the upward and downward directions are transmitted to the automobile seat 12 and then to the buffer cushion 1.

When the impacts are transmitted to the buffer cushion 1 through the automobile seat 12, the air filled in the main air chamber 2 is moved into the auxiliary air chamber 3 through the interconnecting chamber 4. At this time, the air that has been moved into the auxiliary air chamber 3 acts to pressurize the pressurizing plate 7 that is elastically supported by means of the plate spring 9, such that the impacts become buffered. Thus, if the impacts that are applied to the main air chamber 2 are absorbed, the air that has been moved into the auxiliary air chamber 3 is returned to the main air chamber 2 through the interconnecting chamber 4 by virtue of the resilient restoring force of the plate spring 9.

As the plate spring 9 is adjustable in upward and downward directions, the buffering force of the buffer cushion 1 can be adjusted arbitrarily, in which case, the adjusting bolt 10 mounted on the plate spring 9 is released to some extent so as to forward and backward move along the adjustable slit 11 to adjust a desired position, and then fastened again at the desired position. As a result, the elasticity of the plate spring applied to the pressuring plate 7 is adjustable to a desired degree, thereby providing an appropriate buffering force depending on the kind of automobiles or the condition of road surface.

INDUSTRIAL APPLICABILITY

As set forth in the foregoing, a buffer cushion for automobiles according to the present invention has the main air chamber 2 and the auxiliary air chamber 3 that communicate with each other by means of the interconnecting chamber 4, such that the impacts applied to the main air chamber 2 upward and downward directions is transmitted to the auxiliary air chamber 3 via the interconnecting chamber 4, and hence is buffered by the resilient force of the plate spring 9, thereby minimizing the strength of the impacts applied to a user who sits on the buffer cushion. Therefore, even though the user is on the automobile for long hours, his or her fatigue can be remarkably reduced.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A buffer cushion (1) for automobile seats, comprising:
   a main air chamber (2) having a size corresponding to the sizes of the automobile seats;
   an auxiliary air chamber (3) having a relatively smaller size than the main air chamber (2);
   an interconnecting chamber (4) formed integrally with the main air chamber (2) and auxiliary air chamber (3) for communicating the main air chamber (2) and the auxiliary air chamber 3 with each other to allow air injected into the buffer cushion to freely move between the main air chamber (2) and the auxiliary air chamber (3); and
   adjusting means (5) that is mounted on the auxiliary air chamber (3) for buffering the impact applied to the main air chamber (2) and adjusting a buffering force when the impact is applied to an automobile seat in upward and downward directions,
   wherein the adjusting means (5) includes:
   a casing (6) for accommodating the auxiliary air chamber (3) therein, the casing having an adjustable slit (11) formed thereon;
   a pressuring plate (7) disposed at the inside of the casing (6) and axially mounted at one side thereof to the casing by means of a hinge pin (8); and
   a plate spring (9) mounted on the pressuring plate (7) for pressurizing the pressuring plate (7) at a predetermined spring elastic coefficient, the plate spring having an adjusting bolt (10) fixed to one side thereof through the adjustable slit (11) to be moved forward and backward along the adjustable slit.

* * * * *